United States Patent
Gess

[15] 3,656,605
[45] Apr. 18, 1972

[54] APPARATUS FOR ORIENTING AND FEEDING CAPS

[72] Inventor: Larry C. Gess, 10523 Orchard Street, Samaria, Mich. 48177

[22] Filed: June 5, 1970

[21] Appl. No.: 43,833

[52] U.S. Cl. .......................... 198/33 AA, 198/45, 193/43 B
[51] Int. Cl. ................................... B65g 11/20, B65g 47/24
[58] Field of Search .................. 193/43 B, 43 C; 198/33 AC, 198/33 AA; 221/160; 53/313, 314, 315, 316

[56] References Cited

UNITED STATES PATENTS

| | | | |
|---|---|---|---|
| 1,445,296 | 2/1923 | Clark | 53/313 |
| 2,461,290 | 2/1949 | Maynard et al. | 193/43 B |
| 2,964,182 | 12/1960 | Spurlin | 221/160 |

Primary Examiner—Richard E. Aegerter
Attorney—Allen D. Gutchess, Jr.

[57] ABSTRACT

This invention relates to apparatus for orienting and feeding caps to bottles. The caps are oriented in a inverted position and are then moved along a predetermined path to an opening located mostly along one side of the path. When the caps reach the opening, they tilt and fall down a chute and are directed to an inclined track therebelow. The caps are received right side up on the track and are fed sequentially therealong to bottles moving below a lower end of the track.

8 Claims, 4 Drawing Figures

INVENTOR.
LARRY C. GESS
BY
Allen D. Gutchess, jr.
ATTORNEY

INVENTOR.
LARRY C. GESS
BY
Allen D. Gitchess jr
ATTORNEY

APPARATUS FOR ORIENTING AND FEEDING CAPS

This invention relates to apparatus for orienting and feeding caps to containers.

Various apparatus has been known heretofore for orienting caps from an unoriented supply and feeding them to the tops of bottles. The apparatus for accomplishing this heretofore has tended to be complicated, expensive, unreliable, or unduly cumbersome.

The present apparatus for orienting and feeding caps is more simple, reliable, and requires less space than previous ones. The apparatus includes a vibratory bowl feeder with a spiral ramp, which feeder oscillates on a vertical axis in a vibratory manner to move caps upwardly along the ramp. The caps have annular flanges extending from common sides thereof and the ramp has two notches positioned and sized so that if the caps are right side up, the flanges are received in the notches and the caps fall off the side of the ramp back to the bottom of the bowl feeder. If the caps are upside down, they move past the notches, so that all caps on the ramp beyond the notches are located in inverted positions.

The inverted caps are then received on an elongated surface or platform of an orienting member, along which caps are pushed by previous caps on the ramp. Means are provided on the surface to direct the caps along a predetermined path, and an opening is formed in the surface located mostly to one side of the center of the path but extending slightly across the center. When the caps reach the opening, they tilt and fall through a chute located therebelow. The caps are then directed to an upper portion of an inclined track below the chute with the caps received on the chute in right-side-up, sequential positions. The caps then slide down the track by gravity where they are directed onto tops of bottles moving below the lower end of the track.

It is, therefore, a principal object of the invention to provide apparatus for orienting and feeding container caps, which is more simple, reliable, and compact than those heretofore known.

Other objects and advantages of the invention will be apparent from the following detailed description of a preferred embodiment thereof, reference being made to the accompanying drawings, in which.

Figure 1:
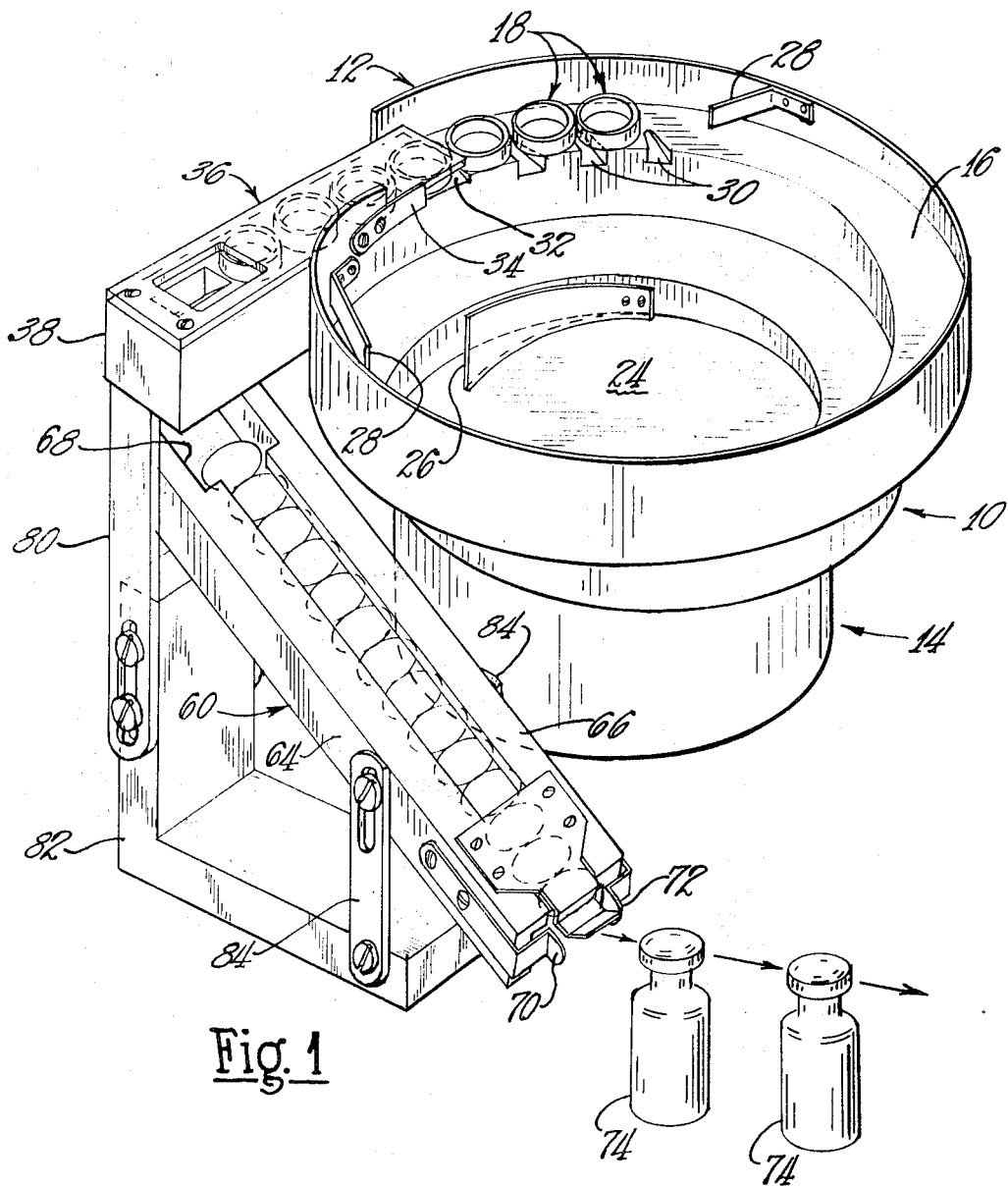
FIG. 1 is a somewhat schematic overall view in perspective of apparatus for orienting and feeding caps in accordance with the invention.
Figure 2:
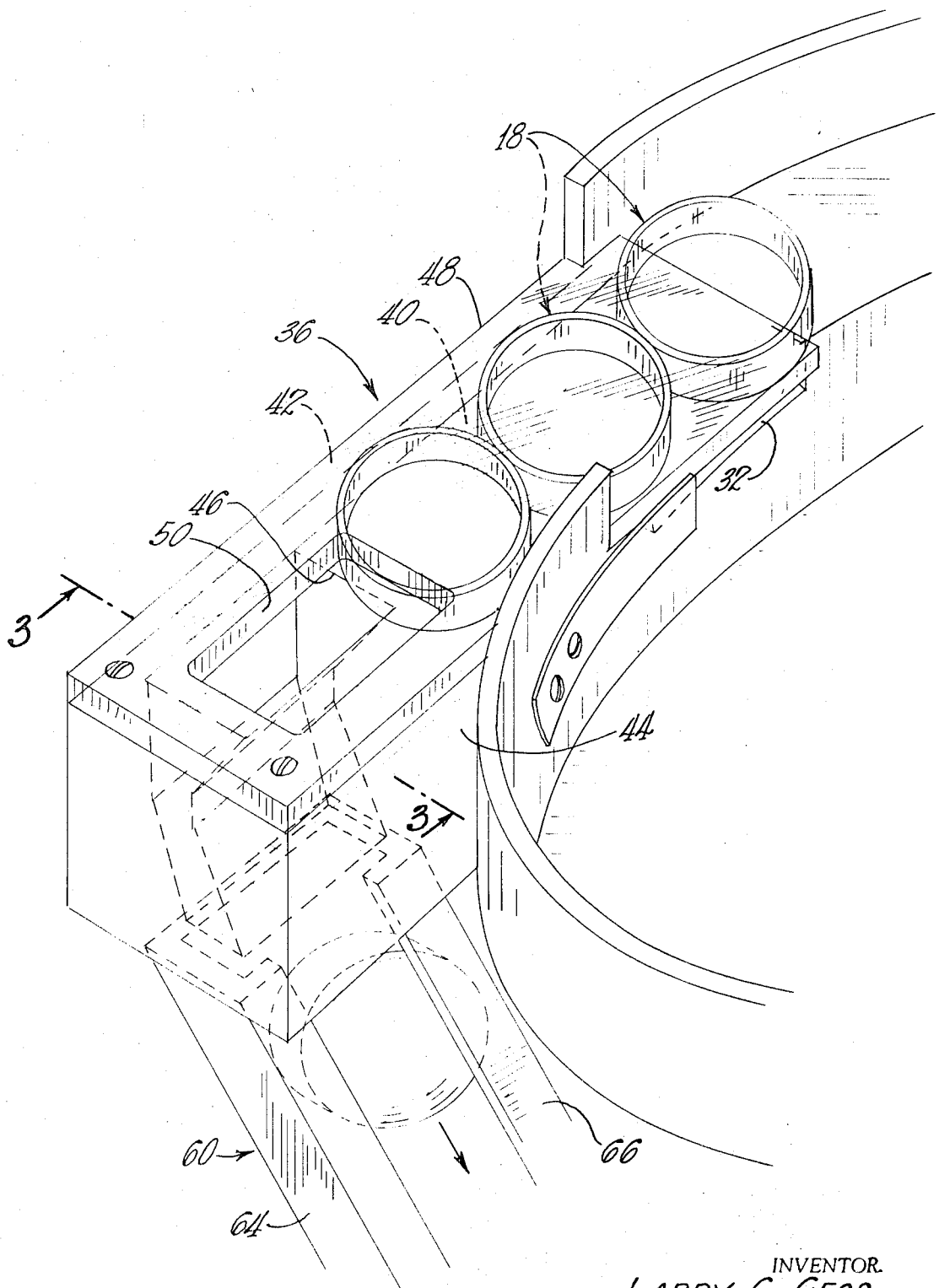
FIG. 2 is an enlarged, fragmentary view in perspective primarily of an orienting member of the apparatus of FIG. 1.

Referring to the drawings, and particularly to FIG. 1, a device for orienting and supplying caps is indicated at 10 and includes a vibratory bowl 12 mounted on a power unit 14. The bowl 12 oscillates about a vertical central axis in a vibratory manner to move caps up a spiral ramp 16. The basic unit 10 is a commercially available product, under the name "Syntron", for example. Caps 18, as shown particularly in FIG. 3, include planar tops 20 and annular depending flanges 22 extending in a common direction from the tops 20.

A supply of the caps 18 is placed on a bottom 24 of the bowl 12 in an unoriented manner. When the power unit 14 is energized, the caps are guided by a curved guide plate 26 up the ramp 16. Two deflecting fingers 28 are mounted in spaced positions above the ramp 16 a distance sufficient to allow only one cap to move thereunder. Hence, upper caps that may be stacked on lower ones are deflected off the ramp. Near the upper end of the ramp 16 are several notches 30 formed in the inner edge of the ramp. The notches are spaced apart a distance to receive two segments of the cap flange 22 when the cap moving up the ramp 16 is in an upright position with the flange 22 extending downwardly. Consequently, when the flange moves into an adjacent two of the notches 30, the cap tilts inwardly and falls off the ramp to begin again. The ramp 16 slants transversely slightly toward the outer wall to retain the caps thereon, but can have a level end portion 32. The inverted caps 18 can then be directed by a final retention guide 34 to an orienting member 36. The level portion 32 and the retention guide 34 are not essential, however, since the ramp 16 can slant slightly up to the entrance of the member 36.

The member 36 comprises a block 38 which can be of metal as shown, but preferably is formed essentially in one piece of injection molded plastic. The block forms an upper surface or platform 40 on which the inverted caps are received and supported. Two side walls 42 and 44 extend upwardly from the surface 40 and guide the caps 18 along a predetermined path, the side walls 42 and 44 being spaced apart slightly in excess of the diameter of the caps. An opening 46 is formed in the surface 40 at an end portion of the member 36 opposite the entrance end at the bowl 12. The opening 46 is generally rectangular, having a length in a direction longitudinally of the surface 40 slightly exceeding the diameter of the caps 18. The opening also extends from the side of the path of the caps, adjacent the side wall 42, across the center thereof, having a width exceeding one-half the diameter of the caps but less than the diameter. Consequently, when the caps reach the opening 46, they tilt downwardly, as shown in FIG. 3.

A cover 48 is supported on the upper edges of the side walls 42 and 44 and is spaced above the surface 40 a distance slightly exceeding the thickness of the caps 18. The cover 48 thereby prevents the caps 18 from moving on top of adjacent caps or "shingling" as they move along the surface 40, being pushed by other caps moving along the ramp 16 under the motion of the bowl 12. An upper opening 50 is formed in the cover 48 to provide clearance for the caps 18 as they tilt downwardly through the opening 46.

Figure 3:
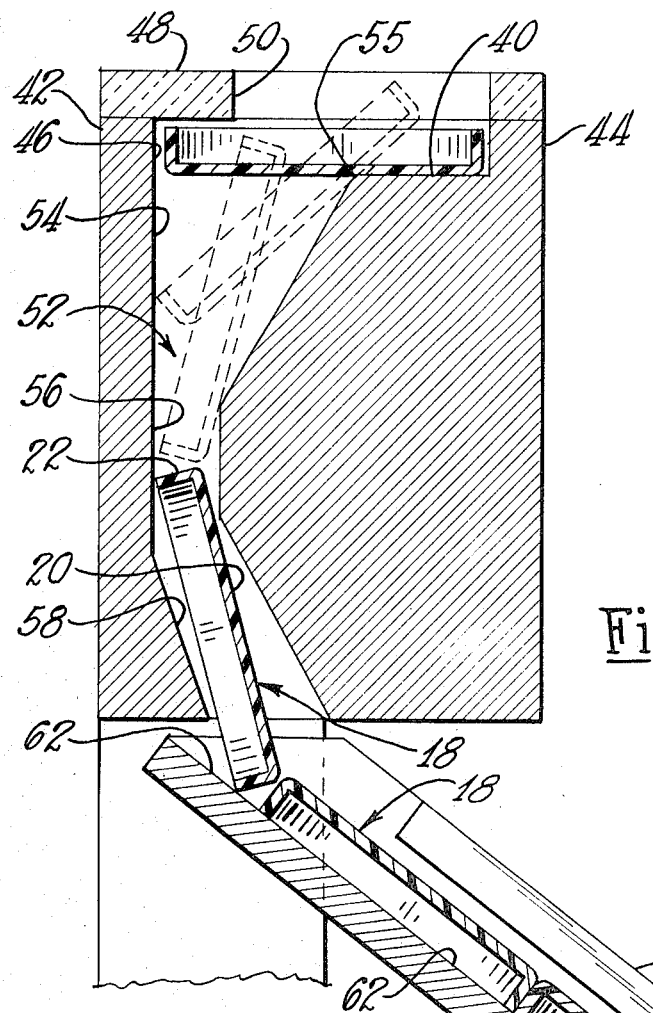
FIG. 3 is a view in transverse cross section taken along the line 3—3 of FIG. 2.

Referring particularly to FIG. 3, a chute indicated at 52 is formed in an end portion of the block 38 below the opening 46. The chute 52 has an upper flared portion 54 receiving the tilted caps and also forming an edge 55 with the surface 40, about which the caps tilt as they begin to move down the chute 52. The chute further has a narrower intermediate portion 56 which receives the caps as they fall downwardly through the chute 52 and restricts the caps to a generally vertical disposition when moving downwardly. Finally, the chute 52 has a lower slanted portion 58 which directs the caps toward the right-side-up position, back in a direction toward the side of the path on the surface 40 opposite to the side of the path in which most of the opening 46 is formed. The slanted discharge portion 58 is flared somewhat in a downward direction to enable the caps 18 to tilt toward the upright position as they move out of the chute. The orienting member thus causes the caps to move from an inverted to a bottle-receiving or upright position in a very short distance.

Figure 4:
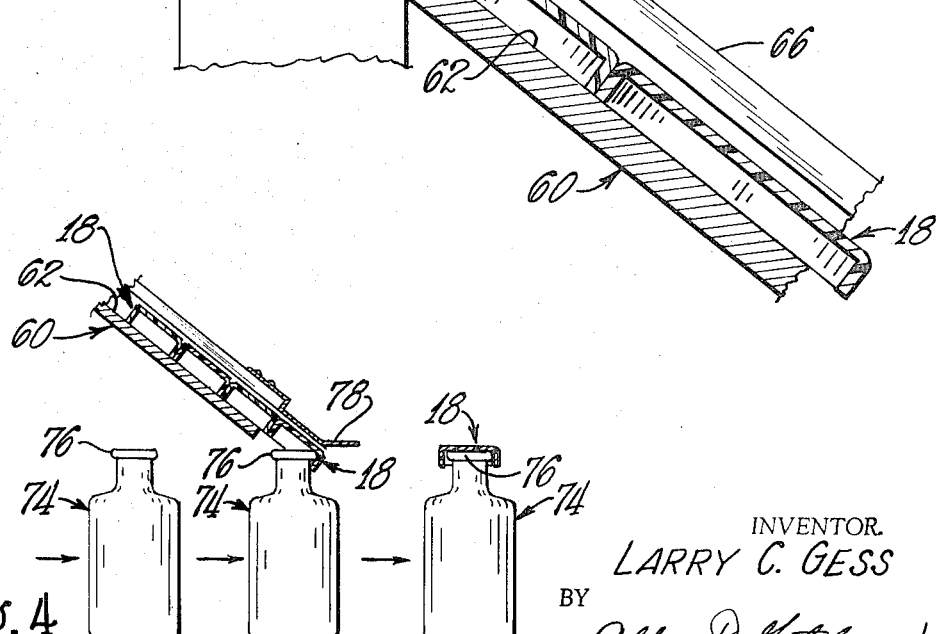
FIG. 4 is a view in longitudinal cross section taken centrally through a track of the apparatus.

An inclined track 60 has a portion located directly below the chute 52 to receive the caps in the upright position. The track includes a web 62 (FIG. 4) forming a supporting surface for the caps 18 with a pair of L-shaped flanges 64 and 66 located at the sides of the web and having inner edges spaced apart a distance less than the diameter of the caps 18, to hold them on the track and prevent shingling. The upper ends of the flanges 64 and 66 stop short of the upper end of the track 50 to provide an opening 68 (FIG. 1) to receive the caps from the chute 52.

At the bottom of the track 60, a pair of resilient side fingers 70 and 72 are affixed to the flanges 64 and 66 and extend inwardly so as to be spaced apart less than the diameter of the caps. The caps thereby project downwardly below the lower edge end of the track 60 (FIG. 4), where the cap flanges 22 are engaged by containers or bottles 74 having upper lips 76 intercepting the inner surfaces of the flanges 22 as the bottles move under the lower end of the track in the direction shown by the arrows. An upper retaining finger 78 holds the caps 18 on the bottles 74 as the bottles move along and remove the caps from the track by pulling on the flanges 22 and spreading the side fingers 70 and 72.

As shown in FIG. 1, the orienting member 36 is supported by a leg 80 which is adjustably affixed to a supporting bracket 82. The track 60 also is adjustably supported by the bracket 82 through legs 84. In this manner, the orienting member and the track can be readily adjusted to accommodate containers of various sizes. The bottles 74 are moved by an indexing wheel or turntable (not shown) in a circular path to clear the bracket 82.

From the above, it will be seen that the invention provides a reliable, yet simple means for orienting and feeding caps. The overall apparatus is also relatively compact, particularly because the orienting member 36 and the track 60 enable the caps to be properly oriented to upright positions in a short space.

Various modifications of the above described embodiments of the invention will be apparent to those skilled in the art and it is to be understood that such modifications can be made without departing from the scope of the invention, if they are within the spirit and the tenor of the accompanying claims.

I claim:

1. Apparatus for orienting and feeding caps to containers, said apparatus comprising means forming an elongate surface to receive and support oriented caps, guide means associated with said surface for directing caps therealong in a predetermined path, the width of the path slightly exceeding the diameter of the caps, means forming a cover spaced above said surface a distance exceeding the thickness of one cap and being less than the thickness of two caps, means forming an opening in said surface in a position such that caps moving along the path will tilt and fall through the opening when reaching the opening, said opening being located principally to one side of the center of the path and extending more than one-half the distance across the path, means forming a chute below the opening to retain caps falling through the opening in a generally vertical position, a track below said chute and having a portion aligned with the bottom of said chute to receive the caps, said track extending at an angle to the horizontal, and means at the end of said track for directing caps onto containers therebelow.

2. Apparatus according to claim 1 characterized further by said track extending transversely to the path and in a direction away from the path opposite the side in which the opening is formed.

3. Apparatus according to claim 1 characterized further by means forming an angular, flared lower portion in said chute to further aid in directing the caps to the track.

4. Apparatus according to claim 1 characterized by said cover having an opening generally above the opening in said surface.

5. Apparatus for orienting and feeding to containers caps having annular flanges extending therefrom, said apparatus comprising means forming an elongate, generally horizontally-disposed surface to receive and support oriented caps, means for supplying oriented caps in an inverted position to said surface, guide means associated with said surface for directing the inverted caps sequentially therealong in a predetermined path, the width of the path slightly exceeding the diameter of the caps, a cover supported above said surface on said guide means and spaced from said surface a distance exceeding the thickness of one cap and less than the thickness of two caps, means forming an opening in said surface located principally to one side of the center of the path and extending more than one-half the distance across the path whereby caps moving along the path will tilt and fall through the opening when reaching same, means forming a chute below the opening to retain caps falling through the opening in a generally vertical position, a track below said chute having a portion aligned with said chute to receive the caps, the caps thereby being directed sequentially in an upright position along said track, said track extending at an angle to the horizontal and transversely to the path, said track further extending away from the path in a direction opposite to the side in which the opening is mostly formed, and finger means at the lower end of said track for positioning caps to be received on containers moving in a path therebelow.

6. Apparatus according to claim 5 characterized by said chute having an upper portion flared upwardly to receive the tilted caps and a lower portion extending at an angle to the vertical to direct the caps toward upright positions on said track.

7. Apparatus according to claim 5 characterized by said cover having an opening generally above the opening in said surface to prevent interference with said caps as they tilt in said surface opening.

8. Apparatus according to claim 7 characterized further by said means for supplying oriented caps to said surface comprising a vibratory bowl having a spiral ramp therein, said ramp having at least two notches along an edge thereof and spaced apart a distance to receive two portions of a flange of an upright cap and cause it to fall off the ramp.

* * * * *